US010359312B2

(12) United States Patent
Lim et al.

(10) Patent No.: US 10,359,312 B2
(45) Date of Patent: Jul. 23, 2019

(54) PIXEL TRANSFER RATE BOOSTING DEVICE

(71) Applicant: PIXART IMAGING INC., Hsin-Chu (TW)

(72) Inventors: Wooi-Kip Lim, Penang (MY); Han-Chi Liu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 32 days.

(21) Appl. No.: 15/687,772

(22) Filed: Aug. 28, 2017

(65) Prior Publication Data

US 2017/0356798 A1   Dec. 14, 2017

Related U.S. Application Data

(63) Continuation-in-part of application No. 15/606,453, filed on May 26, 2017, now Pat. No. 9,899,906, (Continued)

(30) Foreign Application Priority Data

Dec. 24, 2014   (TW) .............................. 103145348 A

(51) Int. Cl.
*G06F 3/0354*   (2013.01)
*G01J 1/46*   (2006.01)
(Continued)

(52) U.S. Cl.
CPC .................. *G01J 1/46* (2013.01); *G05F 1/56* (2013.01); *G06F 3/0383* (2013.01); (Continued)

(58) Field of Classification Search
CPC ...... G01J 1/46; G06F 3/0317; G06F 3/03543; G06F 3/0383; H04N 5/359; H04N 5/3559; H04N 5/361; H04N 5/363; H04N 5/3741

See application file for complete search history.

(56) References Cited

U.S. PATENT DOCUMENTS

2006/0244855 A1* 11/2006 Bock ....................... H04N 3/155
348/308
2013/0076910 A1*  3/2013 Scott ..................... H04N 5/332
348/164

(Continued)

*Primary Examiner* — Adolf D Berhane
*Assistant Examiner* — Jye-June Lee
(74) *Attorney, Agent, or Firm* — Li & Cai Intellectual Property (USA) Office

(57) ABSTRACT

A device, for pixel transfer rate boosting, is provided and includes an image sensing array having a plurality of pixel units, in which each of the plurality of pixel units is configured to generate a pixel signal when receiving an electromagnetic energy, a signal buffer circuit, electrically coupled with the image sensing array to receive the pixel signals, a switch circuit electrically coupled with the signal buffer circuit, a capacitor having a first terminal and a second terminal, in which the first terminal electrically couples with the switch circuit and the second terminal connects to a ground, a comparator, electrically coupled with the switch circuit, and a pull-down unit, electrically coupled with the first terminal of the capacitor and the switch circuit. After the switch circuit is turned on, the pull-down unit pulls the plurality of pixel output signals down.

18 Claims, 7 Drawing Sheets

Related U.S. Application Data which is a continuation-in-part of application No. 14/739,259, filed on Jun. 15, 2015, now Pat. No. 9,696,737.

(51) Int. Cl.
| | |
|---|---|
| *G05F 1/56* | (2006.01) |
| *G06F 3/038* | (2013.01) |
| *H04N 5/355* | (2011.01) |
| *H04N 5/359* | (2011.01) |
| *H02M 3/156* | (2006.01) |

(52) U.S. Cl.
CPC . *G06F 3/03543* (2013.01); *H02M 2003/1566* (2013.01); *H04N 5/359* (2013.01); *H04N 5/3559* (2013.01)

(56) References Cited

U.S. PATENT DOCUMENTS

2013/0206961 A1\* 8/2013 Ikeda ............... H04N 5/378
                                                                250/208.1
2016/0227135 A1\* 8/2016 Matolin ............. H04N 5/335

\* cited by examiner

PIXEL TRANSFER RATE BOOSTING DEVICE

CROSS-REFERENCE TO RELATED APPLICATION

This application is a continuation-in-part application of U.S. application Ser. No. 15/606,453 filed on May 26, 2017, now pending, which is a continuation-in-part application of U.S. application Ser. No. 14/739,259 filed on Jun. 15, 2015, now issued. The entirety of each of the above-mentioned patent applications is hereby incorporated by reference herein and made as a part of this specification.

BACKGROUND OF THE INVENTION

1. Field of the Invention

The present disclosure relates to a pixel transfer rate boosting device; more particularly, to a pixel transfer rate boosting without increasing source follower current.

2. Description of Related Art

The inch per second, which can be abbreviated as in/s, in/sec or ips, is a unit of speed or velocity. The inch per second expresses the distance in inches (in) traveled or displaced. In mouse application for example, mice with sensors, such as optical sensors or laser sensors, would have a maximum speed at which they can be moved before their sensors lose their ability to track the movement of the mice. By the maximum speed, this further means that each mouse has an upper limit on speed at which it can be moved. If mice are moved at a speed exceeding its ips rating, the mouse cursor will begin to exhibit jerky movement or, even worse, will simply skip across the screen.

A high ips is especially important when it comes to certain scenarios, such as video gaming, which needs higher ips to support the fast movement of the mice. In order to achieve ips in certain mouse applications, sensors need to run at a high frame rate. In other words, the pixel transfer rate needs to be increased to shorten the transfer time in this respect.

FIG. 1 is a schematic view illustrating a conventional image sensor circuit. In FIG. 1, the pixel storage cap signal (INT) will be transferred to the comparator 100 through the source follower 101. The speed of transferring depends on the source follower current Isf. In other words, that is, the higher the source follower current Isf is, the higher the charging/discharging rate would be, as well as the shorter settling time. But high source follower current Isf would cause the dynamic range of the source follower 101 to drop, and further leads to distortion on the pixel output signal.

The relationship between dynamic range and distortion can be better comprehended when FIG. 2 is explained together, where FIG. 2 is a schematic view illustrating the relationship between the dynamic range and the distortion. The source follower current Isf shown in solid and dotted lines is respectively 50 and 25 micro-ampere (uA). It can be seen from FIG. 2 that a reduced output range occurs under higher source follower current Isf (i.e., 50 uA). It can also be seen that when Isf is increased from 25 uA to 50 uA in order to have a higher transfer rate, dynamic range is sacrificed in exchange. Furthermore, distortion to the pixel output signal under Isf is 50 uA that occurs earlier than Isf is 25 uA.

SUMMARY OF THE INVENTION

A pixel transfer rate boosting device is provided in the present disclosure to at least solve the problems as addressed above, while the pixel transfer rate boosting device as provided in the present disclosure increases the pixel transfer rate without increasing the source follower current as set forth above, and further the pixel transfer rate boosting device as provided in the present disclosure has a better power consumption performance and dynamic range.

A device, for pixel transfer rate boosting, as provided in one of the embodiments of the present disclosure includes an image sensing array having a plurality of pixel units, in which each of the plurality of pixel units is configured to generate a pixel signal when receiving an electromagnetic energy, a signal buffer circuit, electrically coupled with the image sensing array to receive the pixel signals, a switch circuit electrically coupled with the signal buffer circuit, a capacitor having a first terminal and a second terminal, in which the first terminal electrically couples with the switch circuit and the second terminal connects to a ground, a comparator, electrically coupled with the switch circuit, and a pull-down unit, electrically coupled with the first terminal of the capacitor and the switch circuit. After the switch circuit is turned on, the signal buffer circuit generates a plurality of pixel output signals according to the pixel signals, and the pull-down unit is configured to pull the plurality of pixel output signals down.

In another one of the embodiments of the present disclosure, a pull-down circuit for pixel transfer rate boosting is also provided. The pull-down circuit includes a pixel unit, configured to generate a pixel signal when receiving an electromagnetic energy, a signal buffer circuit, electrically coupled with the pixel unit to receive the pixel signal and to output an output signal, a switch circuit electrically coupled with the signal buffer circuit, a capacitor having a first terminal and a second terminal, in which the first terminal electrically couples with the switch circuit and the second terminal connects to a ground, a comparator, electrically coupled with the switch circuit, and a pull-down unit, electrically coupled with the first terminal of the capacitor and the switch circuit. After the switch circuit is turned on, and the signal buffer circuit generates a pixel output signal according to the pixel signal, and the pull-down unit is configured to pull the pixel output signal.

In order to further understand the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

Figure 1:
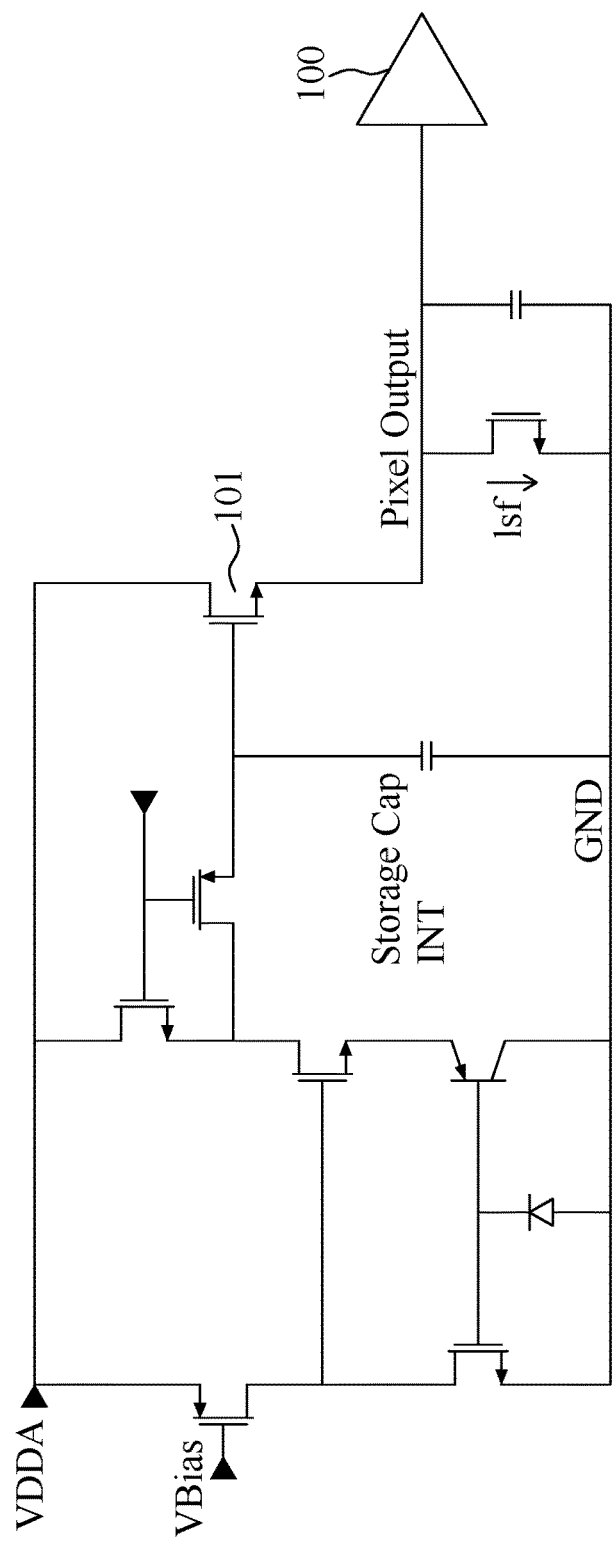
FIG. 1 is a schematic view illustrating a conventional image sensor circuit.
Figure 2:
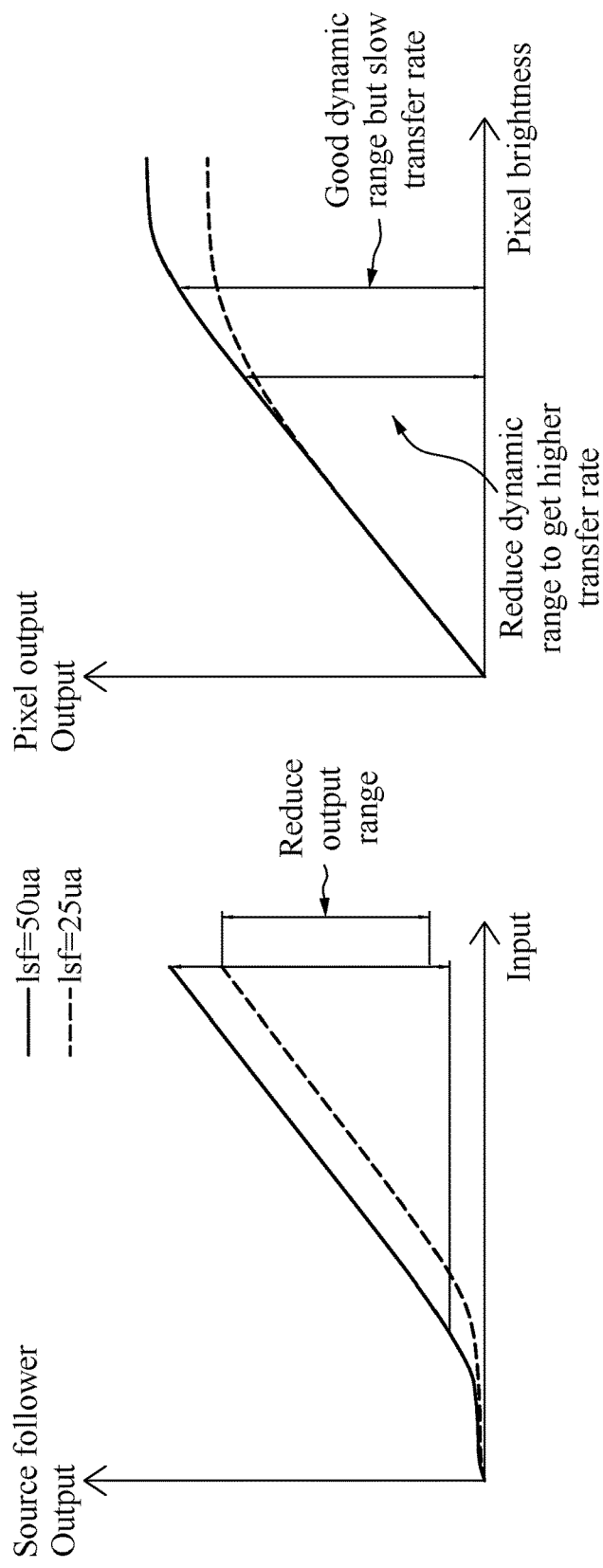
FIG. 2 is a schematic view illustrating the relationship between the dynamic range and the distortion.
Figure 3:
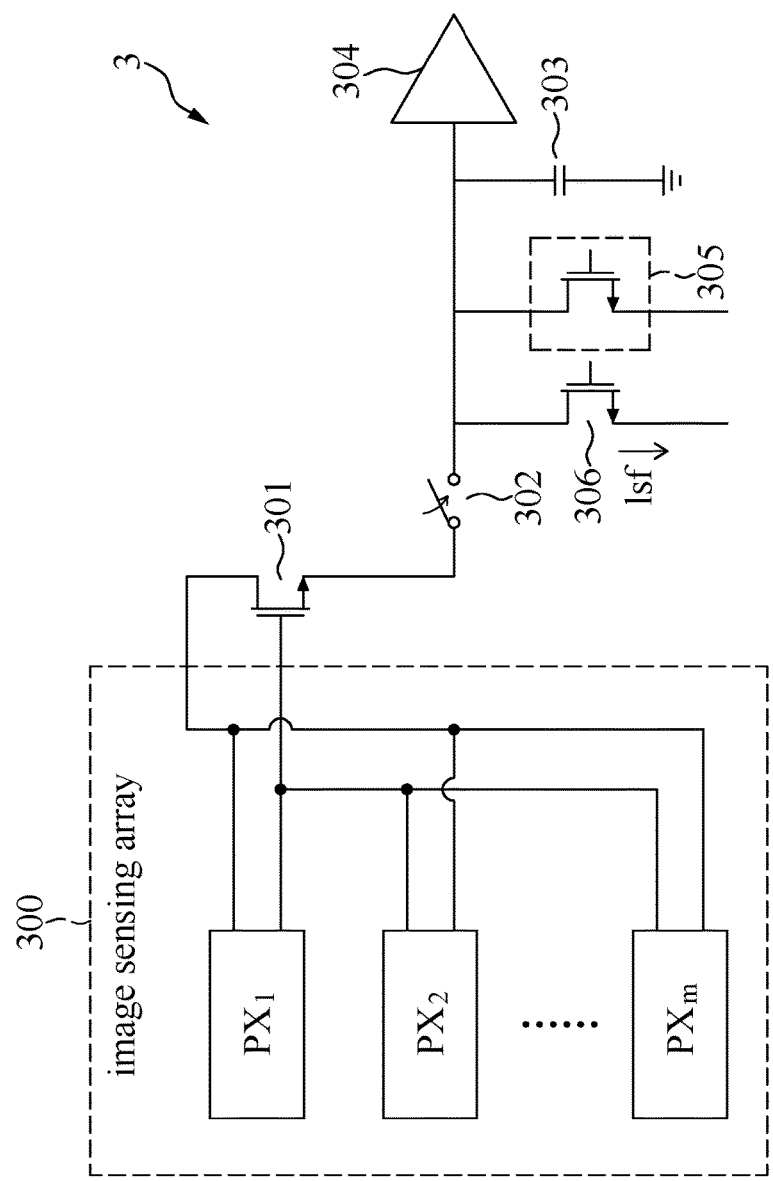
FIG. 3 is a schematic view illustrating the pixel transfer rate boosting device according to an embodiment of the present disclosure.

For an embodiment of the present disclosure, reference is first made to FIG. 3, which is a schematic view illustrating the pixel transfer rate boosting device according to an embodiment of the present disclosure. As shown in FIG. 3, the device for boosting the pixel transfer rate includes an image sensing array 300, a signal buffer circuit 301, a switch circuit 302, a capacitor 303, a comparator 304 and a pull-down unit 305.

The image sensing array 300 has a plurality of pixel units $PX_1$~$PX_m$ (m is an integer greater than 1), wherein each of the plurality of pixel units $PX_1$~$PX_m$ is configured to generate a pixel signal when receiving an electromagnetic energy. In other words, each of the plurality of pixel units $PX_1$~$PX_m$ of the image sensing array 300 is configured to generate a pixel signal when receiving, sensing or detecting an electromagnetic energy (not shown in the figure). The electromagnetic energy can be in any form, people with ordinary skill in the art, when referring to the present disclosure, can understand that the electromagnetic energy can be, such as an electromagnetic signal. In the present embodiment as shown in FIG. 3, the electromagnetic energy is a light signal. That is to say, when each of the plurality of pixel units $PX_1$~$PX_m$ of the image sensing array 300 senses a light signal (not shown in the figure), each of the plurality of pixel units $PX_1$~$PX_m$ accordingly generates a pixel signal in response to the light signal that each of the plurality pixel units $PX_1$~$PX_m$ sensed. Each of the pixel units $PX_1$~$PX_m$ of the present embodiment can be, but not limited to, a complementary metal-oxide semiconductor (CMOS) or a charge-coupled device (CCD). Each of the pixel units $PX_1$~$PX_m$ can also be any other devices capable of sensing light. The principles and theories of the pixel units $PX_1$~$PX_m$, such as how do the pixel units $PX_1$~$PX_m$ sense the light signal and how does it generate the pixel signal accordingly are well known in the art and are well known to people with ordinary skill in the field, and the relevant descriptions would thus be omitted for the sake of brevity.

The signal buffer circuit 301 electrically couples with the image sensing array 300, and more particularly, the signal buffer circuit 301 electrically couples with each of the plurality pixel units $PX_1$~$PX_m$, to receive the pixel signals generated by and passed from the each of the pixel units $PX_1$~$PX_m$. The signal buffer circuit 301 further outputs an output signal, i.e., a pixel output signal, according to the pixel signals. The signal buffer circuit 301 can be, but not limited to, a unity gain buffer, or an NMOS source follower. The signal buffer circuit 301 in the present embodiment is exemplified as an n-channel MOSFET 301 (NMOS source follower 301) having a gate, a source and a drain, as shown in FIG. 3. The gate and the drain of the NMOS source follower 301 couple with the each of the pixel units $PX_1$~$PX_m$, and the source of the NMOS source follower 301 couples with the switch circuit 302.

The switch circuit 302 electrically couples with the NMOS source follower 301. The capacitor 303 has a first terminal and a second terminal (both terminals are not labeled in the figure), in which the first terminal electrically couples with the switch circuit 302 and the second terminal connects to a ground.

The comparator 304 electrically couples with the switch circuit 302, and the pull-down unit 305 electrically couples with the first terminal of the capacitor 303 and the switch circuit 302. In the present embodiment as shown in FIG. 3, the pull-down unit 305 is, but not limited to, a pull-down NMOS 305 having a gate, a source and a drain. The drain of the NMOS 305 is electrically coupled with the first terminal of the capacitor 303 and the switch circuit 302.

Figure 4:
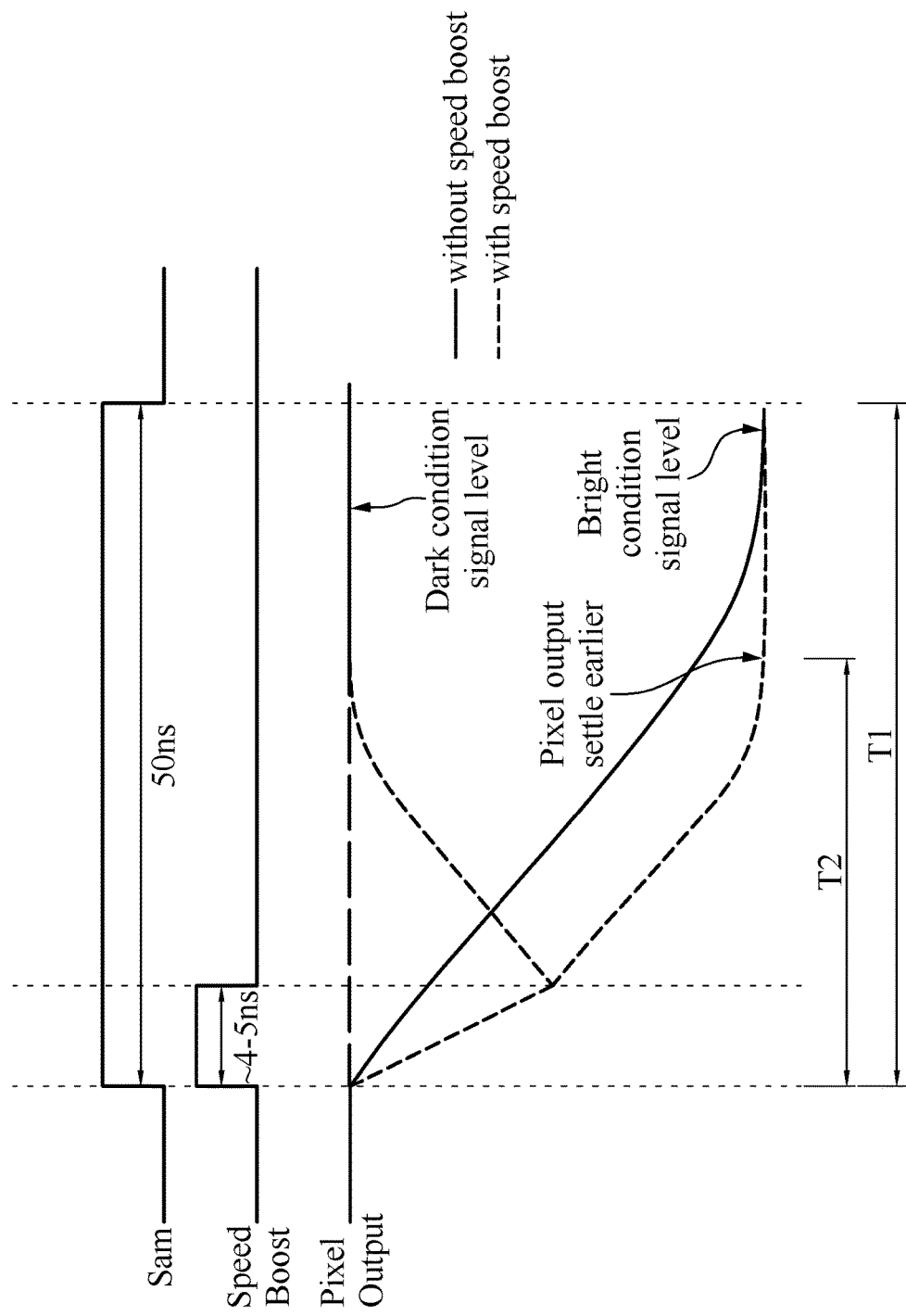
FIG. 4 is a schematic view illustrating the pixel transfer rate boosting device according to another embodiment of the present disclosure.

Reference is collectively made to FIG. 4 for better understanding the present disclosure, where FIG. 4 is a schematic view illustrating a comparison between the pixel output signals being and not being pulled down. The solid lines in FIG. 4 represent the pixel output signal not being pulled down, and in other words, without speed boost. The dotted lines stand for pixel signal being pulled down, which means with speed boost.

For the pixel output signal not being pulled down (without speed boost as the solid lines shown in FIG. 4)

The switch circuit 302 is turned on for 50 ns (nanosecond). The switch circuit 302 is then turned off for a certain period before it is turned on again. The 50 ns turned-on period as mentioned above is only an example, which implies that the turned-on period for the switch circuit 302 is not limited, and it can be designed by people with ordinary in the art according to different practical situations, such as 60 ns, 70 ns, or 100 ns.

Regarding the dotted lines, after the switch circuit 302 is turned on, the NMOS source follower 301 then generates a plurality of pixel output signals according to the pixel signals. The pixel output signal induces a current isf on the NMOS 306. In the present embodiment, 25 uA Isf is exemplified and is used to transfer the full range of pixel signal to the comparator 304. The pixel output signal either maintains its signal level for dark condition, or goes down for bright condition. It can be seen in FIG. 4 that the time it took for the pixel output signal to reach to the bottom is T1, and the bottom means the bright condition signal level. In this regard, it takes around 50 ns to transfer the full range of pixel signal to the comparator 304 (T2 is around 50 ns).

For the pixel output signal being pulled down (with speed boost as the dotted lines shown in FIG. 4)

In contrast to the scenario that the pixel output signal is pulled down, that is the dotted lines as shown in FIG. 4, which is with speed boost. The pixel output signal would be passed to the pull-down NMOS 305 after the switch circuit 302 is turned on. After the switch circuit 302 is turned on, the NMOS source follower 301 generates a plurality of pixel output signals according to the pixel signal, and the pull-down NMOS 305 pulls the plurality of pixel output signals down. In the following descriptions, only one single pixel output signal would be taken as an example for the sake of conciseness. Taking one single pixel output signal as an example, the pixel output signal is pulled down to point A within 4 to 5 nanosecond after the switch circuit 302 is turned on. After the pixel signal is pulled down to point A, the pixel signal either raises back to its signal level for dark condition, or goes down for bright condition. It can be seen from FIG. 4 that the time it took for the pulled-down pixel output signal to reach to the bottom is T2, and that bottom means the bright condition signal level.

The period within which the pixel output signal is pulled down is not limited to 4 to 5 nanoseconds. The 4 to 5 nanoseconds pull-down period exemplified here should not be a limitation imposed on the present disclosure. The pull-down period can also range from 3 to 6 nanoseconds, for example, while people with ordinary skill in the art can have different options for this pull-down period, as long as the pixel output signal is pulled down during the period.

The time the pulled-down pixel output signal to reach to the bottom T2 is shorter than the time the pixel output signal not being pulled-down T1 (T2<T1), which explains the fact that the pixel output of the pulled-down pixel output signal settles earlier than that of the pixel output signal not being pulled-down. Taking a closer look at FIG. 4, the pixel output signal not being pulled-down drops to point B after 4 to 5 nanoseconds, whereas the pixel output signal being pulled-down drops further to point A during the same period, which leads to the pulled-down pixel output signal to settle earlier than the pixel output signal not being pulled-down.

The idea of this speed boost is to use the pull-down NMOS 305 to pull the pixel output signal down to half of the full pixel signal range within a short pulse, and then only release Isf to do rest of the work as shown in FIG. 4. This means that Isf needs to discharge/charge the other half of full pixel signal range from/to the capacitor 304. In dark condition, Isf needs to charge the capacitor 304, whereas in bright condition, Isf needs to discharge the capacitor 304.

By the use of the pull-down NMOS 305, a higher pixel transfer rate can be achieved by using the same 25 uA source follower current, which further achieves a better power consumption performance and dynamic range.

In the present embodiment, the pixel output signal is pulled down to half of the original pixel output signal. How much degree the pixel output signal to be pulled down is not limited in the present disclosure, as long as the pixel output signal is pulled down, resulting in the pulled-down pixel output signal to settle earlier. Preferably, the pixel output signal is substantially pulled down to 25-75% of its original level.

Figure 5:
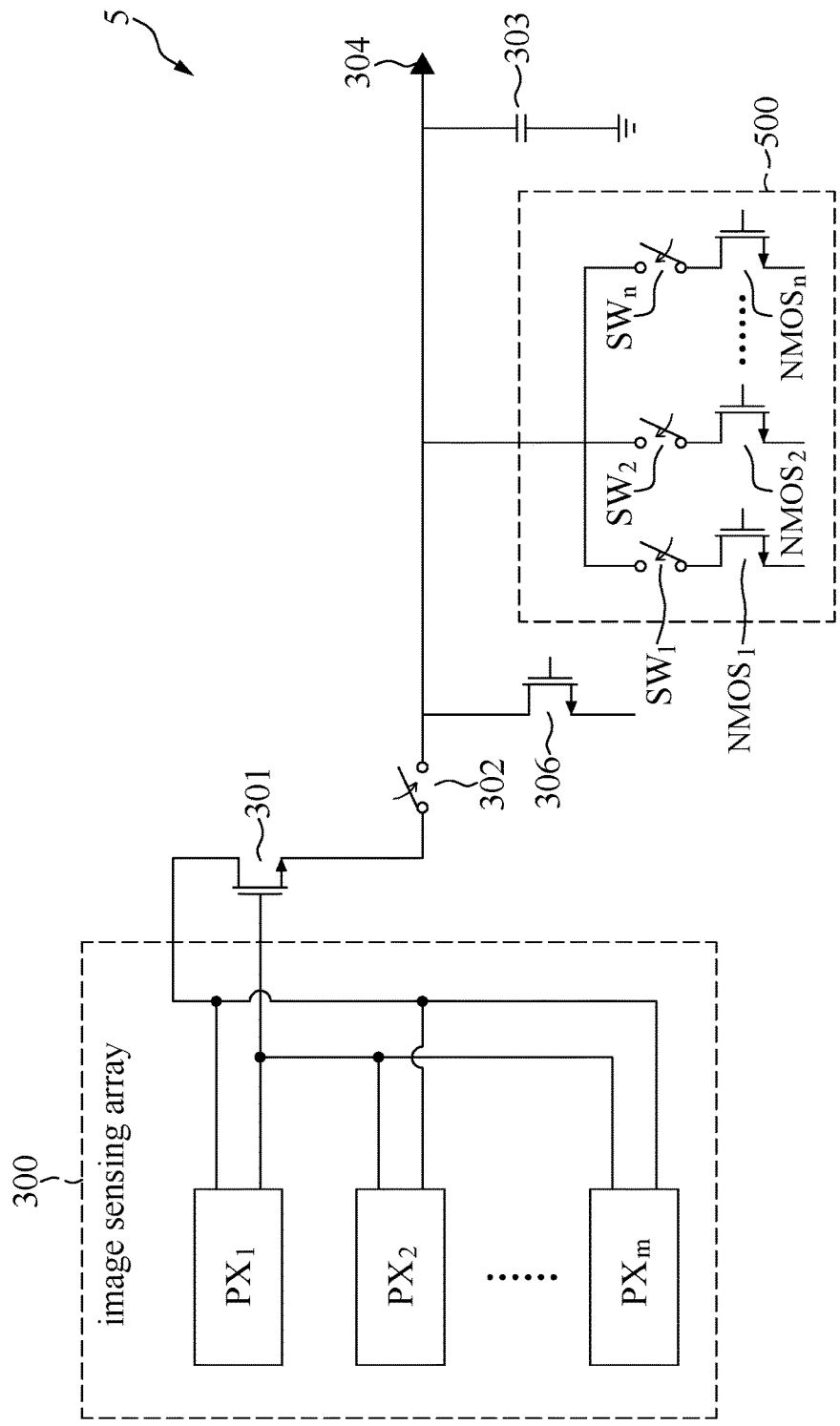
FIG. 5 is a schematic view illustrating the pull-down unit being a. NMOS bank.

In another embodiment, the pull-down unit 305 can be a NMOS bank, as illustrated in FIG. 5. FIG. 5 is a schematic view illustrating the pull-down unit being a NMOS bank. The pull down circuit 5 shown in FIG. 5 has essentially the same structure as the pull down circuit 3 shown in FIG. 3, that it includes an image sensing array 300, a signal buffer circuit 301, a switch circuit 302, a capacitor 303 and a comparator 304. The image sensing array 300 has a plurality of pixel units $PX_1$~$PX_m$ (in is an integer greater than 1), wherein each of the plurality of pixel units $PX_1$~$PX_m$ is configured to generate a pixel signal when receiving an electromagnetic energy.

The difference is that the pull-down unit 305 as in FIG. 3 is replaced with an NMOS bank 500 here in FIG. 5. The NMOS bank 500 includes a plurality of NMOSs $NMOS_1$~$NMOS_n$ (n is an integer greater than 1) and a plurality of switches $SW_1$~$SW_n$ (n is an integer greater than 1). Each of the plurality of NMOSs $NMOS_1$~$NMOS_n$ has a gate, a source and a drain, and the drains of each of the plurality of NMOSs $NMOS_1$~$NMOS_n$ electrically couple with the first terminal of the capacitor and the switch circuit 302 through each of the plurality of switches $SW_1$~$SW_n$. The NMOS bank 500 can further include a control unit (not shown in the figure), such as a processor. The plurality of the switches $SW_1$~$SW_n$ are controlled by the control unit.

The pull-down circuit with this configuration as shown in FIG. 5 exhibits better flexibility in response to different situations. For example, since the signal characteristics (e.g., intensity, magnitude, or phase) of the pixel signal depend on the light signal, it can be construed that different light signals with different signal characteristics would generate different pixel signals. In this respect, the pull down degree varies from pixel signal to pixel signal.

The signal characteristics of different pixel signals would be sent to the control unit for processing, and the control unit would determine which one (or more than one) among the plurality of the switches $SW_1$~$SW_n$ should be turned on, for one single NMOS connected with the turned-on switch to pull the pixel signal down alone, or a group of NMOSs connected with the turned-on switches to pull the pixel signal down collectively.

The implementations to the control unit are not elaborated, for the sake of brevity, since people with ordinary skill art can understand how to implement this control unit after reviewing the present disclosure, that also means that the implementations of the control unit are not limited by the present disclosure, and that people with ordinary skill art can have different designs to the control unit to suit different practical demands.

Figure 6:
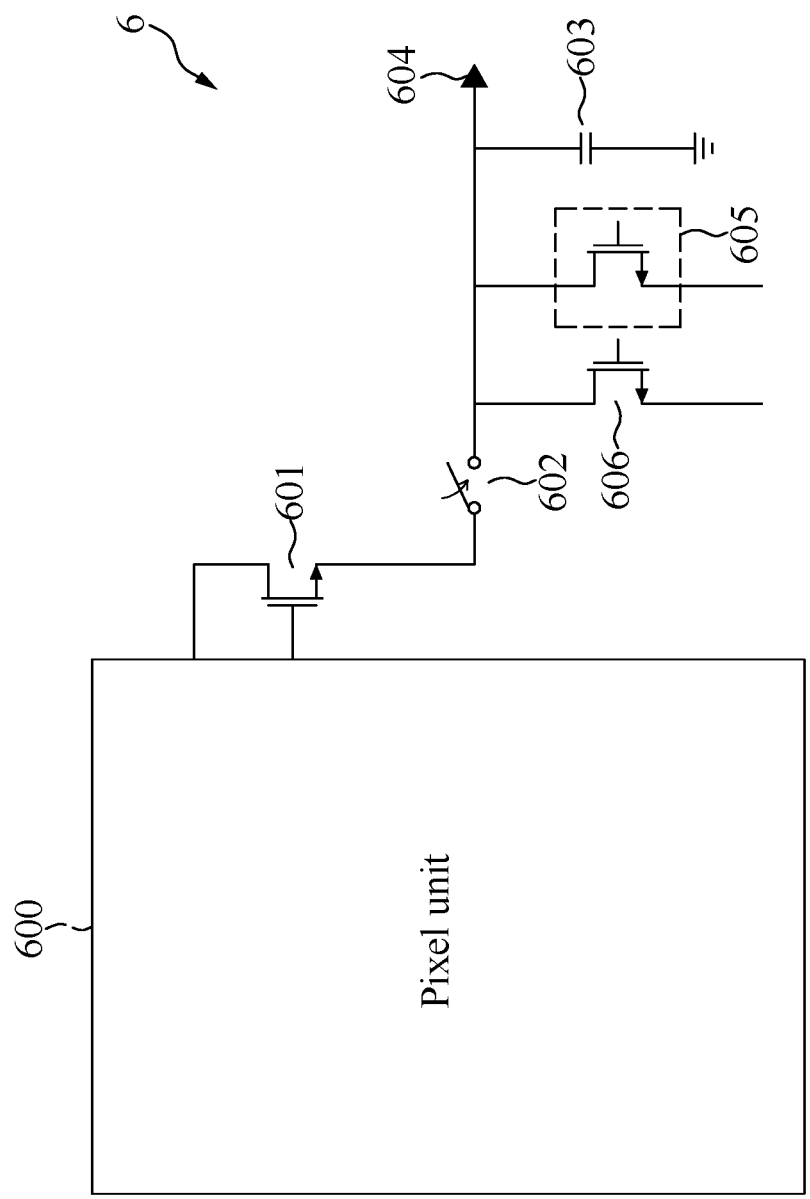
FIG. 6 is a schematic view illustrating the pull-down circuit according to an embodiment of the present disclosure.

For another embodiment of the present disclosure, reference is next made to FIG. 6, which is a schematic view illustrating the pull-down circuit according to an embodiment of the present disclosure. As shown in FIG. 6, the pull-down circuit 6 for boosting the pixel transfer rate includes a pixel unit 600, a signal buffer circuit 601, a switch circuit 602, a capacitor 603, a comparator 604 and a pull-down unit 605.

The pixel unit 600 is configured to generate a pixel signal in response to an electromagnetic energy. In other words, the pixel unit 600 is configured to generate a pixel signal when receiving, sensing or detecting an electromagnetic energy. The electromagnetic energy (not shown in the figure) can be in any form, people with ordinary skill in the art, when referring to the present disclosure, can understand that the electromagnetic energy can be, such as an electromagnetic signal. In the present embodiment as shown in FIG. 6, the electromagnetic energy is a light signal (not shown in the figure). That is to say, when the pixel unit 600 senses a light signal, the pixel unit 600 accordingly generates a pixel signal in response to the light signal. The pixel unit 600 of the present embodiment can be, but not limited to, a complementary metal-oxide semiconductor (CMOS) or a charge-coupled device (CCD). The pixel unit 600 can also be any other devices capable of sensing light. The principles and theories within the pixel unit 600, such as how does the pixel unit 600 sense the light signal and how does it generate the pixel signal accordingly are well known in the art and are well known to people with ordinary skill in the field, and the relevant descriptions would be omitted for the sake of brevity.

The signal buffer circuit 601 electrically couples with the pixel unit 600 to receive that pixel signal generated by and passed from the pixel unit 600. The signal buffer circuit 601 further outputs an output signal, i.e., a pixel output signal, according to the pixel signal. The signal buffer circuit 601 can be, but not limited to, a unity gain buffer, or an NMOS source follower. The signal buffer circuit 601 in the present embodiment is exemplified as an n-channel MOSFET 601 (NMOS source follower 301) having a gate, a source and a drain. The gate and the drain of the NMOS source follower 601 couple with the pixel unit 600, and the source of the NMOS source follower 601 couples with the switch circuit 602.

The switch circuit 602 electrically couples with the NMOS source follower 601. The capacitor 603 has a first terminal and a second terminal (both terminals are not labeled in the figure), in which the first terminal electrically couples with the switch circuit 602 and the second terminal connects to a ground.

The comparator 604 electrically couples with the switch circuit 602, and the pull-down unit 605 electrically couples with the first terminal of the capacitor 603 and the switch circuit 602. In the present embodiment as shown in FIG. 6, the pull-down unit 605 is, but not limited to, an NMOS 605 having a gate, a source and a drain. The drain of the NMOS 605 is electrically coupled with the first terminal of the capacitor 603 and the switch circuit 602.

Figure 7:
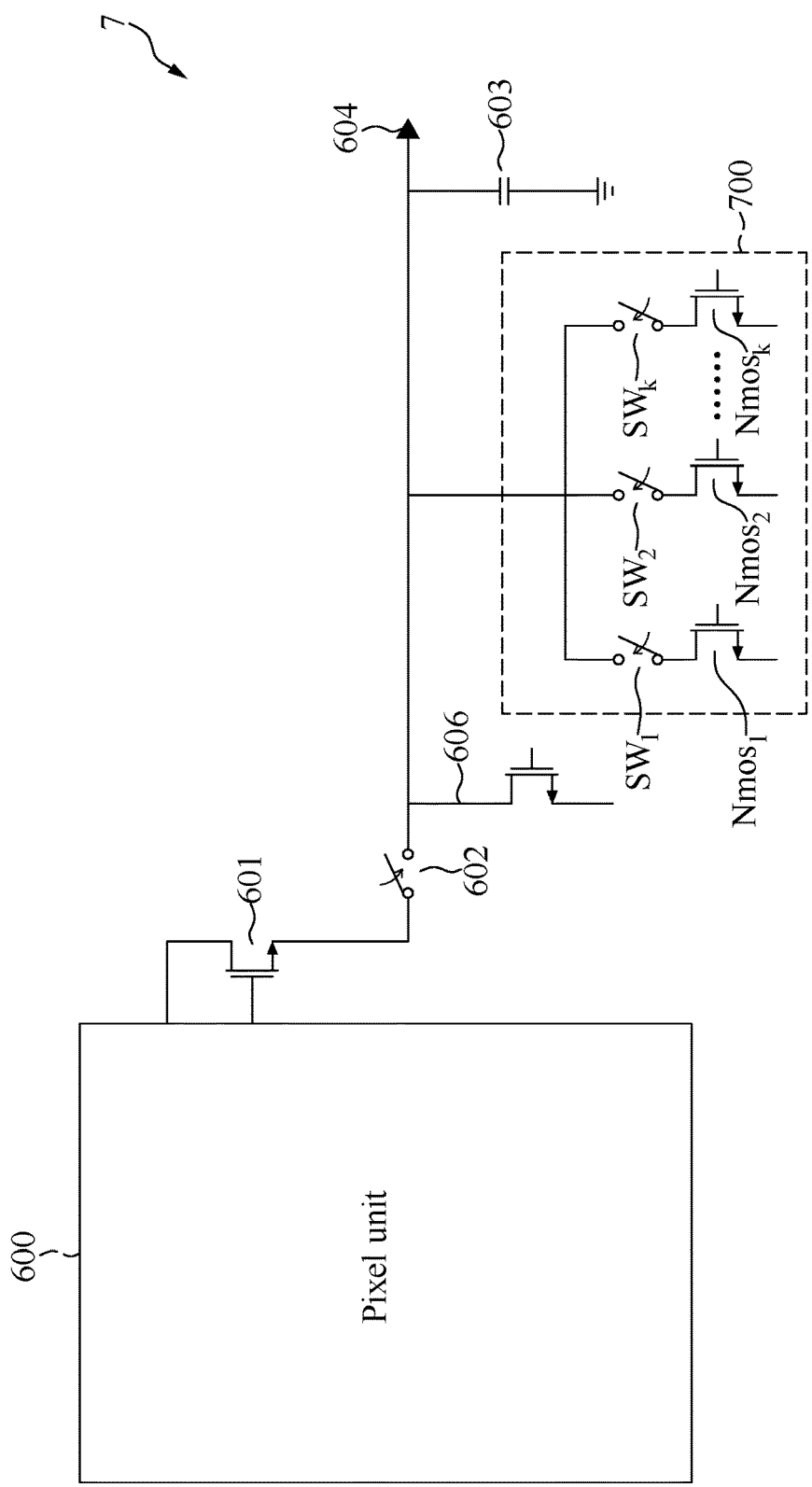
FIG. 7 is a schematic view illustrating the pull-down circuit according to another embodiment of the present disclosure.

In another embodiment, the pull-down unit can be a NMOS bank 605, as illustrated in FIG. 7. FIG. 7 is a schematic view illustrating the pull-down unit being a NMOS bank. The pull down circuit 7 shown in FIG. 7 has essentially the same structure as the pull down circuit 6 shown in FIG. 6, that it includes a pixel unit 600, a signal buffer circuit 601, a switch circuit 602, a capacitor 603 and a comparator 604.

The difference is that the pull-down unit 605 as in FIG. 6 is replaced with an NMOS bank 700 here in FIG. 7. The NMOS bank 700 includes a plurality of NMOSs $NMOS_1 \sim NMOS_k$ (k is an integer greater than 1) and a plurality of switches $SW_1 \sim SW_k$ (k is an integer greater than 1). Each of the plurality of NMOSs $NMOS_1 \sim NMOS_k$ has a gate, a source and a drain, and the drains of each of the plurality of NMOSs $NMOS_1 \sim NMOS_k$ electrically couple with the first terminal of the capacitor and the switch circuit 602 through each of the plurality of switches $SW_1 \sim SW_k$. The NMOS bank 700 can further include a control unit (not shown in the figure), such as a processor. The plurality of the switches $SW_1 \sim SW_k$ are controlled by the control unit.

The pull-down circuit with this configuration as shown in FIG. 7 exhibits better flexibility in response to different situations. For example, since the signal characteristics (e.g., intensity, magnitude, or phase) of the pixel signal depend on the light signal, it can be construed that different light signals with different signal characteristics would generate different pixel signals. In this respect, the pull down degree varies from pixel signal to pixel signal.

The signal characteristics of different pixel signals would be sent to the control unit for processing, and the control unit would determine which one (or more than one) among the plurality of the switches $SW_1 \sim SW_k$ should be turned on, for one single NMOS connected with the turned-on switch to pull the pixel signal down alone, or a group of NMOSs connected with the turned-on switches to pull the pixel signal down collectively.

The implementations to the control unit are not elaborated, for the sake of brevity, since people with ordinary skill art can understand how to implement this control unit after reviewing the present disclosure, that also means that the implementations of the control unit are not limited by the present disclosure, and that people with ordinary skill art can have different designs to the control unit to suit different practical demands.

In sum, a pixel transfer rate boosting device and a pull-down circuit are provided in the present disclosure. The pixel transfer rate boosting device and the pull-down circuit are capable of increasing the pixel transfer rate without increasing the source follower current, and further the pixel transfer rate boosting device as provided in the present disclosure has a better power consumption performance and dynamic range.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A device, comprising:
   an image sensing array having a plurality of pixel units, wherein each of the plurality of pixel units is configured to generate a pixel signal when receiving electromagnetic energy;
   a signal buffer circuit, electrically coupled with the image sensing array to receive the pixel signals;
   a switch circuit electrically coupled with the signal buffer circuit and configured to be turned on for a turned-on period;
   a capacitor having a first terminal and a second terminal, in which the first terminal electrically couples with the switch circuit and the second terminal connects to a ground;
   a comparator, electrically coupled with the switch circuit; and
   a pull-down unit, electrically coupled with the first terminal of the capacitor and the switch circuit;
   wherein after the switch circuit is turned on, the signal buffer circuit generates a plurality of pixel output signals according to the pixel signals, and the pull-down unit is configured to pull the plurality of pixel output signals down for a pull-down period that is within the turned-on period of the switch circuit.

2. The device according to claim 1, wherein the pull-down unit is an n-channel MOSFET (NMOS) having a gate, a source and a drain, and the drain being electrically coupled with the first terminal of the capacitor and the switch circuit.

3. The device according to claim 1, wherein the pull-down unit is an NMOS bank including a plurality of NMOSs and a plurality of switches, and each of the plurality of NMOSs having a gate, a source and a drain.

4. The device according to claim 3, wherein the drain of each of the plurality of NMOSs is electrically coupled with the first terminal of the capacitor and the switch circuit through each of the plurality of switches.

5. The device according to claim 4, wherein the NMOS bank further includes a control unit and the plurality of the switches are controlled by the control unit.

6. The device according to claim 1, wherein the signal buffer circuit is a unity gain buffer, or an NMOS source follower having a gate, a source and a drain.

7. The device according to claim 1, wherein 25% to 75% of the plurality of pixel output signals are substantially pulled down.

8. The device according to claim 1, wherein the pull-down period ranges from 3 to 6 nanoseconds.

9. The device according to claim 1, wherein the plurality of pixel units are a complementary metal-oxide semiconductor (CMOS) or a charge-coupled device (CCD).

10. A pull-down circuit, comprising:
    a pixel unit, configured to generate a pixel signal when receiving electromagnetic energy;
    a signal buffer circuit, electrically coupled with the pixel unit to receive the pixel signal and to output an output signal;
    a switch circuit electrically coupled with the signal buffer circuit and configured to be turned on for a turned-on period;
    a capacitor having a first terminal and a second terminal, in which the first terminal electrically couples with the switch circuit and the second terminal connects to a ground;

a comparator, electrically coupled with the switch circuit; and a pull-down unit, electrically coupled with the first terminal of the capacitor and the switch circuit;

wherein after the switch circuit is turned on, and the signal buffer circuit generates a pixel output signal according to the pixel signal, and the pull-down unit is configured to pull the pixel output signal down for a pull-down period that is within the turned-on period of the switch circuit.

11. The pull-down circuit according to claim 10, wherein the pull-down unit is an n-channel MOSFET (NMOS) having a gate, a source and a drain, and the drain being electrically coupled with the first terminal of the capacitor and the switch circuit.

12. The pull-down circuit according to claim 10, wherein the pull-down unit is a NMOS bank including a plurality of NMOSs and a plurality of switches, and each of the plurality of NMOSs having a gate, a source and a drain.

13. The pull-down circuit according to claim 12, wherein the drain of each of the plurality of NMOSs is electrically coupled with the first terminal of the capacitor and the switch circuit through each of the plurality of switches.

14. The pull-down circuit according to claim 13, wherein the NMOS bank further includes a control unit and the plurality of the switches are controlled by the control unit.

15. The pull-down circuit according to claim 10, wherein the signal buffer circuit is a unity gain buffer, or an NMOS source follower having a gate, a source and a drain.

16. The pull-down circuit according to claim 10 wherein 25% to 75% of the pixel output signal is substantially pulled down.

17. The pull-down circuit according to claim 10, wherein the pull-down period ranges from 3 to 6 nanoseconds.

18. The pull-down circuit according to claim 10, wherein the pixel unit is a complementary metal-oxide semiconductor (CMOS) or a charge-coupled device (CCD).

* * * * *